(12) United States Patent
Lam et al.

(10) Patent No.: US 6,954,804 B2
(45) Date of Patent: Oct. 11, 2005

(54) CONTROLLER FOR PORTABLE ELECTRONIC DEVICES

(75) Inventors: James Lam, Fremont, CA (US); Bruce Denning, Monterey, CA (US); Sterling Du, Palo Alto, CA (US)

(73) Assignee: Micro, Inc., Santa Clara, CA (US)

( * ) Notice: Subject to any disclaimer, the term of this patent is extended or adjusted under 35 U.S.C. 154(b) by 19 days.

(21) Appl. No.: 10/402,755

(22) Filed: Mar. 28, 2003

(65) Prior Publication Data

US 2004/0024931 A1 Feb. 5, 2004

Related U.S. Application Data

(63) Continuation-in-part of application No. 09/650,515, filed on Aug. 29, 2000, now Pat. No. 6,675,233, which is a continuation-in-part of application No. 09/595,103, filed on Jun. 16, 2000, now Pat. No. 6,711,631, which is a continuation of application No. 09/136,207, filed on Aug. 19, 1998, now Pat. No. 6,226,237.

(60) Provisional application No. 60/216,853, filed on Jul. 7, 2000, provisional application No. 60/183,181, filed on Feb. 17, 2000, provisional application No. 60/182,448, filed on Feb. 15, 2000, and provisional application No. 60/079,508, filed on Mar. 26, 1998.

(51) Int. Cl.[7] ............................. G06F 13/10; G06F 1/32

(52) U.S. Cl. ............................. 710/14; 710/8; 710/62; 713/300; 713/324

(58) Field of Search ........................... 710/8, 14, 62, 710/72, 74; 713/300, 310, 320, 323, 324; 700/94

(56) References Cited

U.S. PATENT DOCUMENTS

| | | | |
|---|---|---|---|
| 4,851,987 A | 7/1989 | Day | 364/200 |
| 4,968,987 A | 11/1990 | Naka et al. | 341/143 |
| 4,999,634 A | 3/1991 | Brazdrum et al. | 341/172 |
| 5,142,684 A | 8/1992 | Perry et al. | 395/750 |
| 5,167,024 A | 11/1992 | Smith et al. | 395/375 |
| 5,200,913 A | 4/1993 | Hawkins et al. | 364/708 |
| 5,218,704 A | 6/1993 | Watts, Jr. et al. | 395/750 |
| 5,375,076 A | 12/1994 | Goodrich et al. | 364/708.1 |
| 5,511,203 A | 4/1996 | Wisor et al. | 395/750 |
| 5,548,777 A | 8/1996 | Woo | 395/821 |
| 5,560,024 A | 9/1996 | Harper et al. | 395/750 |
| 5,600,800 A | 2/1997 | Kikinis et al. | 395/281 |
| 5,619,402 A | 4/1997 | Liu | 363/20 |
| 5,634,798 A | 6/1997 | Suh | 434/307 |
| 5,642,417 A | 6/1997 | Stringer | 380/4 |
| 5,646,699 A | 7/1997 | Oh et al. | 348/553 |
| 5,671,368 A | 9/1997 | Chan et al. | 395/282 |

(Continued)

FOREIGN PATENT DOCUMENTS

| | | | |
|---|---|---|---|
| EP | 0825519 | 2/1998 | G06F/1/26 |
| EP | 0945778 | 9/1999 | G06F/1/32 |
| EP | 0999549 | 5/2000 | G11B/20/10 |
| JP | 09-191848 | 4/1997 | G06G/1/32 |
| KR | 99078492 | 11/1999 | |
| WO | WO 96/38841 | 12/1996 | G11B/19/02 |

Primary Examiner—Ilwoo Park

(57) ABSTRACT

A controller for use with laptop and notebook digital computers for reproducing compressed digital audio and video files. The controller includes a drive interface for traversing and accessing data stored on a drive of a computer system. Function keys or a remote controller permit users to access drives containing desired data. The selected data is read from the drive. A decoder circuit parses the data into audio data and video data and decodes each set of data to generate a decoded audio data stream or video data stream. The audio data stream can be converted to an analog signal by the controller, or sent to an external ADC of the computer system. Advantageously, the controller operates when the computer system is in an inactive state, for example in power saving mode or OFF, and operates in passthrough or bypass mode when the computer system is ON or active.

21 Claims, 7 Drawing Sheets

U.S. PATENT DOCUMENTS

| | | | |
|---|---|---|---|
| 5,692,197 A | 11/1997 | Narad et al. | 395/750 |
| 5,696,975 A | 12/1997 | Moore et al. | 395/712 |
| 5,699,244 A | 12/1997 | Clark, Jr. et al. | 364/420 |
| 5,708,840 A | 1/1998 | Kikinis et al. | 395/800 |
| 5,732,266 A | 3/1998 | Moore et al. | 395/651 |
| 5,790,875 A | 8/1998 | Andersin et al. | 395/750.03 |
| 5,796,705 A | 8/1998 | Kim | 369/124 |
| 5,797,089 A | 8/1998 | Nguyen | 455/403 |
| 5,815,679 A | 9/1998 | Liu | 395/309 |
| 5,819,116 A | 10/1998 | Maupin et al. | 395/888 |
| 5,822,598 A | 10/1998 | Lam | 395/750.06 |
| 5,835,759 A | 11/1998 | Moore et al. | 395/651 |
| 5,838,983 A | 11/1998 | Atkinson | 395/750.06 |
| 5,870,355 A | 2/1999 | Fujihara | 369/32 |
| 5,903,764 A | 5/1999 | Shyr et al. | 395/750.01 |
| 5,910,933 A | 6/1999 | Moore | 369/33 |
| 5,964,878 A | 10/1999 | Ryu | 713/323 |
| 5,969,529 A | 10/1999 | Eiraku et al. | 324/433 |
| 5,974,549 A | 10/1999 | Golan | 713/200 |
| 5,983,073 A | 11/1999 | Ditzik | 455/11.1 |
| 6,006,285 A | 12/1999 | Jacobs et al. | 710/14 |
| 6,006,337 A * | 12/1999 | Koo | 713/324 |
| 6,018,724 A | 1/2000 | Arent | 705/44 |
| 6,034,621 A | 3/2000 | Kaufman | 340/825.44 |
| 6,038,672 A | 3/2000 | Klein | 713/322 |
| 6,047,223 A | 4/2000 | Sartori | 700/83 |
| 6,047,342 A | 4/2000 | Depew | 710/102 |
| 6,047,380 A | 4/2000 | Nolan et al. | 713/324 |
| 6,076,133 A | 6/2000 | Brainard et al. | 710/260 |
| 6,088,730 A | 7/2000 | Kato et al. | 709/227 |
| 6,088,809 A | 7/2000 | Atkinson | 713/324 |
| 6,101,562 A | 8/2000 | Chang et al. | 710/73 |
| 6,125,417 A | 9/2000 | Bailis et al. | 710/103 |
| 6,141,052 A | 10/2000 | Fukumitsu et al. | 348/373 |
| 6,151,012 A | 11/2000 | Bullister | 345/168 |
| 6,154,359 A | 11/2000 | Kamikakai et al. | 361/681 |
| 6,173,417 B1 | 1/2001 | Merrill | 714/15 |
| 6,195,713 B1 | 2/2001 | Chaiken et al. | 710/19 |
| 6,202,121 B1 | 3/2001 | Walsh et al. | 711/100 |
| 6,226,237 B1 | 5/2001 | Chan et al. | 369/33 |
| 6,233,464 B1 | 5/2001 | Chmaytelli | 455/556 |
| 6,252,511 B1 | 6/2001 | Mondshine et al. | 340/636 |
| 6,259,597 B1 | 7/2001 | Anzai et al. | 361/683 |
| 6,266,714 B1 | 7/2001 | Jacobs et al. | 710/14 |
| 6,272,575 B1 | 8/2001 | Rajchel | 710/102 |
| 6,292,440 B1 | 9/2001 | Lee | 369/7 |
| 6,304,261 B1 | 10/2001 | Shields et al. | 345/358 |
| 6,310,634 B1 | 10/2001 | Bodnar et al. | 345/854 |
| 6,332,175 B1 | 12/2001 | Birrell et al. | 711/112 |
| 6,334,149 B1 | 12/2001 | Davis, Jr. et al. | 709/219 |
| 6,336,142 B1 | 1/2002 | Kato et al. | 709/227 |
| 6,349,386 B1 | 2/2002 | Chan | 713/323 |
| 6,356,905 B1 | 3/2002 | Gershman et al. | 707/10 |
| 6,370,631 B1 | 4/2002 | Dye | 211/170 |
| 6,377,530 B1 | 4/2002 | Burrows | 369/69.12 |
| 6,378,010 B1 | 4/2002 | Burks | 710/68 |
| 6,378,077 B1 | 4/2002 | Atkinson | 713/324 |
| 6,385,734 B2 | 5/2002 | Atkinson | 713/324 |
| 6,393,499 B1 | 5/2002 | Chaiken et al. | 710/19 |
| 6,412,075 B1 | 6/2002 | Klein | 713/322 |
| 6,446,073 B1 | 9/2002 | D'Amato et al. | 707/202 |
| 6,522,832 B1 * | 2/2003 | Fujikawa | 386/125 |
| 6,675,233 B1 | 1/2004 | Du et al. | 710/14 |
| 2001/0028562 A1 | 10/2001 | Naghi | 362/85 |

* cited by examiner

CONTROLLER FOR PORTABLE ELECTRONIC DEVICES

CROSS REFERENCE TO RELATED APPLICATIONS

This application is a continuation-in-part application of application Ser. No. 09/650,515, filed Aug. 29, 2000, now U.S. Pat. No. 6,675,233, which itself is a continuation-in-part of application Ser. No. 09/595,103 filed Jun. 16, 2000, now U.S. Pat. No. 6,711,631, which is a continuation of application Ser. No. 09/136,207, filed Aug. 19, 1998, now U.S. Pat. No. 6,226,237, both of which claim benefit of U.S. Provisional Patent Application No. 60/079,508 filed Mar. 26, 1998. This application also claims benefit to Provisional Application Ser. No. 60/182,448 filed Feb. 15, 2000, Provisional Application Ser. No. 60/183,181, filed Feb. 17, 2000 and Provisional Application Ser. No. 60/216,853 filed Jul. 7, 2000.

FIELD OF THE INVENTION

The present invention relates generally to portable devices for reproducing audio and video recordings, and more particularly, to a device for reproducing compressed digital audio and video data.

DESCRIPTION OF RELATED ART

Presently there exist various portable devices for replaying digital audio recordings that have been compressed in accordance with a compressed audio digital recording format called MP3. These devices can be divided into two classes, those which store the MP3 compressed digital audio recordings in an electronic solid state memory, and those which record the compressed digital audio for subsequent reproduction using an electro-mechanical device such as a compact disk ("CD") player or on a hard disk drive of a digital computer.

Portable devices for replaying MP3 compressed digital audio recordings that use electronic solid state memory, i.e. flash-memory, are capable of storing about ten (10) music selections. With an add-in memory card, such devices can carry a total of about twenty (20) music selections. These MP3 players that store the MP3 compressed digital audio recordings in an electronic solid state memory consume comparatively little electrical power. Thus, such MP3 players provide an extended playing interval without battery replacement or recharging for the limited number of selections which they can store.

In addition to having a capacity for only a limited number of music selections, another characteristic of portable MP3 players that store compressed digital audio recordings in an electronic solid state memory is the inconvenience associated with loading the music selections into that memory. In general, such MP3 players require first downloading or obtaining copies of MP3 compressed digital audio recordings on a hard disk drive of a personal computer, and then transferring the MP3 compressed digital audio recordings from the personal computer to the portable MP3 player. The preceding operations are to be contrasted with the simplicity of merely inserting a compact disk ("CD") into a CD player, or playing MP3 compressed digital audio recordings directly from a hard disk drive or CD drive of a digital computer.

MP3 players which preserve compressed digital audio recordings for reproduction using an electromechanical device are capable of storing many more music selections than portable MP3 players that store compressed digital audio recordings in an electronic solid state memory, e.g. hundreds or even more than one-thousand. However, usually MP3 players that use electromechanical devices require significant amounts of electrical power. Thus, portable players that reproduce music selections using an electromechanical device exhibit comparatively short playing interval, e.g. less than one (1.0) hour before batteries must be replaced or recharged.

Batteries used in laptop and notebook computers usually permit their operation for several hours before becoming discharged. As is readily apparent, a laptop or notebook computer can be to play MP3 compressed digital audio recordings using either the computer's CD-ROM or hard disk drive. Pending U.S. patent application Ser. No. 09/136,207, now U.S. Pat. No. 6,226,237, entitled "Low Power CD-ROM Player for Portable Computers" that was filed on Aug. 19, 1998, which is hereby incorporated by reference in its entirety, describes how a conventional laptop or notebook computer, when simply playing a conventional music CD, consumes an unnecessarily large amount of electrical energy. Such an excessive electrical energy consumption drains a laptop or notebook computer's battery of power that is more prudently applied in performing microprocessor intensive tasks such as word processing and spreadsheet analysis. The solution presented in the '207 application is a state machine that operates when main power to the portable device is OFF. The '207 invention couples a CD-ROM to the audio subsystem (when main power is OFF) so that CDs can be played, without excessive battery drain, or without having to boot up the portable computer.

SUMMARY OF THE INVENTION

A computer system adapted to access data when the computer system is in an inactive state consistent with the invention includes a computer subsystem and a controller. The computer subsystem includes a system CPU and a drive for storing data. The controller includes a drive interface configured to selectively access data from the drive and a decoder circuit configured to decode the data and provide decoded data, wherein the controller is configured to access the drive to retrieve the data and decode the data when the computer subsystem is in the inactive state. The data may be audio data or video data.

In another embodiment, a method for playing files in a computer system when the computer system is in an inactive state includes the steps of: selecting data; generating a data stream from the selected data; and decoding the selected data and generating a decoded data stream. Again, the data may be audio data or video data.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

FIGS. 1–4 depict an example of the preferred MP3 audio controller of the present invention. As an overview, the present invention is directed to an MP3 audio controller 18 adapted to play stored MP3 files. It is intended, in this embodiment, that the MP3 controller of the present invention be integrated within a computer system 10 (e.g., portable lap-top computer) and is adapted with the necessary logic to permit selection, retrieval and play of MP3 files stored locally on the computer, without the necessity of having the computer system turned ON. As used herein, the term inactive is defined to mean a state in which main power is not being supplied (i.e., an OFF state), or when the system is in a sleep mode (such as may be defined under power management specifications). Thus, the present invention provides significant power savings when playing MP3 audio files.

Figure 1:
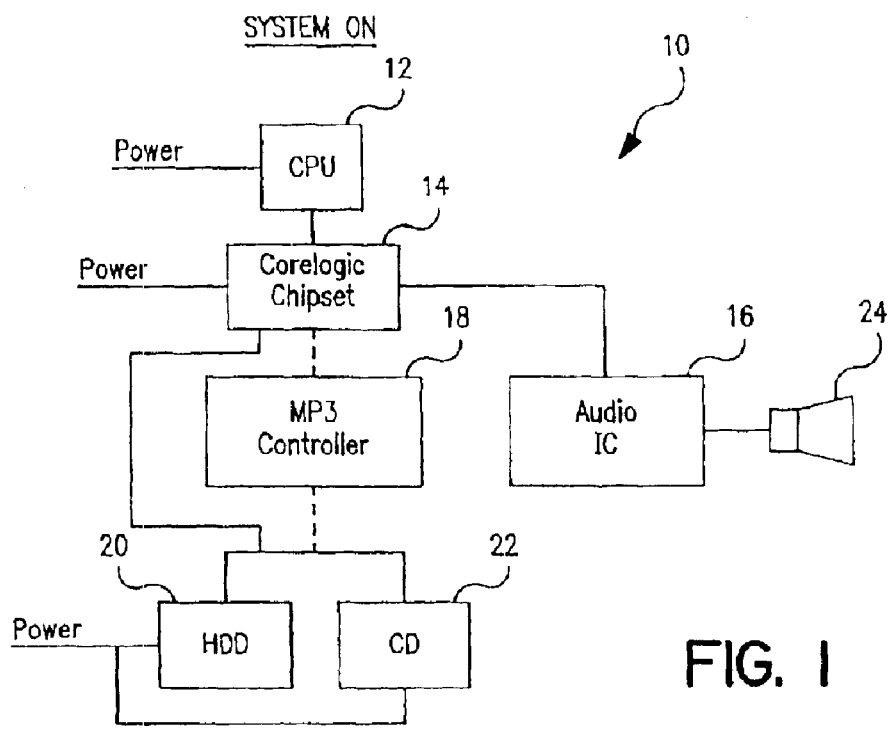
FIG. 1 is an exemplary block diagram of a portable system in an ON state adapted to receive and play MP3 digital audio files, according to one embodiment of the present invention.

FIG. 1 depicts a computer system 10 adapted with the MP3 controller 18 of the present invention in an ON state. Generally, the computer system 10 includes a system CPU 12, a Corelogic chipset 14, a hard disk drive (HDD) 20, a CD-ROM drive (CD) 22, and an audio subsystem (denoted as "audio IC") 16 coupled to a speaker system 24. When main power is being delivered to the system 10 (i.e., the computer is ON), it is preferable that the MP3 controller does not control the play of MP3 files, since such functionality is usually handled by the CPU 12 and an MP3 decoder (typically software). Thus, when the system is ON, the MP3 controller 18 is transparent to commands between the drives 20 and/or 22 and the CPU. Although the figures depict drives 20 and 22 as a hard disk device and a CD-ROM device, respectively, it is intended that any drive mechanism (e.g., RAM drive, DVD drive, backup drive, etc.) known to those skilled in the art can be substituted for these drives 20 and/or 22 without departing from the present invention.

Figure 2:
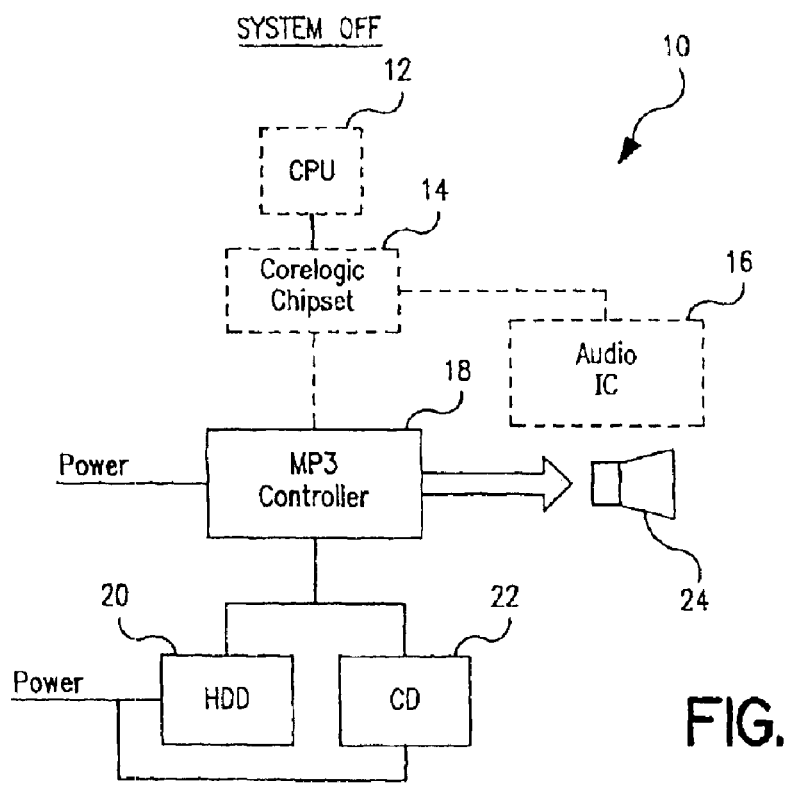
FIG. 2 is an exemplary block diagram of a portable system in an OFF or inactive state adapted to receive and play MP3 digital audio files, according to one embodiment of the present invention.

Conversely, when the system is OFF, as depicted in FIG. 2, the MP3 controller of the present invention operates to permit users to traverse the drives 20 and/or 22 to play MP3 files stored therein directly, without requiring that the CPU 12, CPU chipset 14, or audio subsystem 16 be operating. To that end, as shown in this Figure, system power need only be supplied to the controller 18, and to the drives 20, 22.

Figure 3:
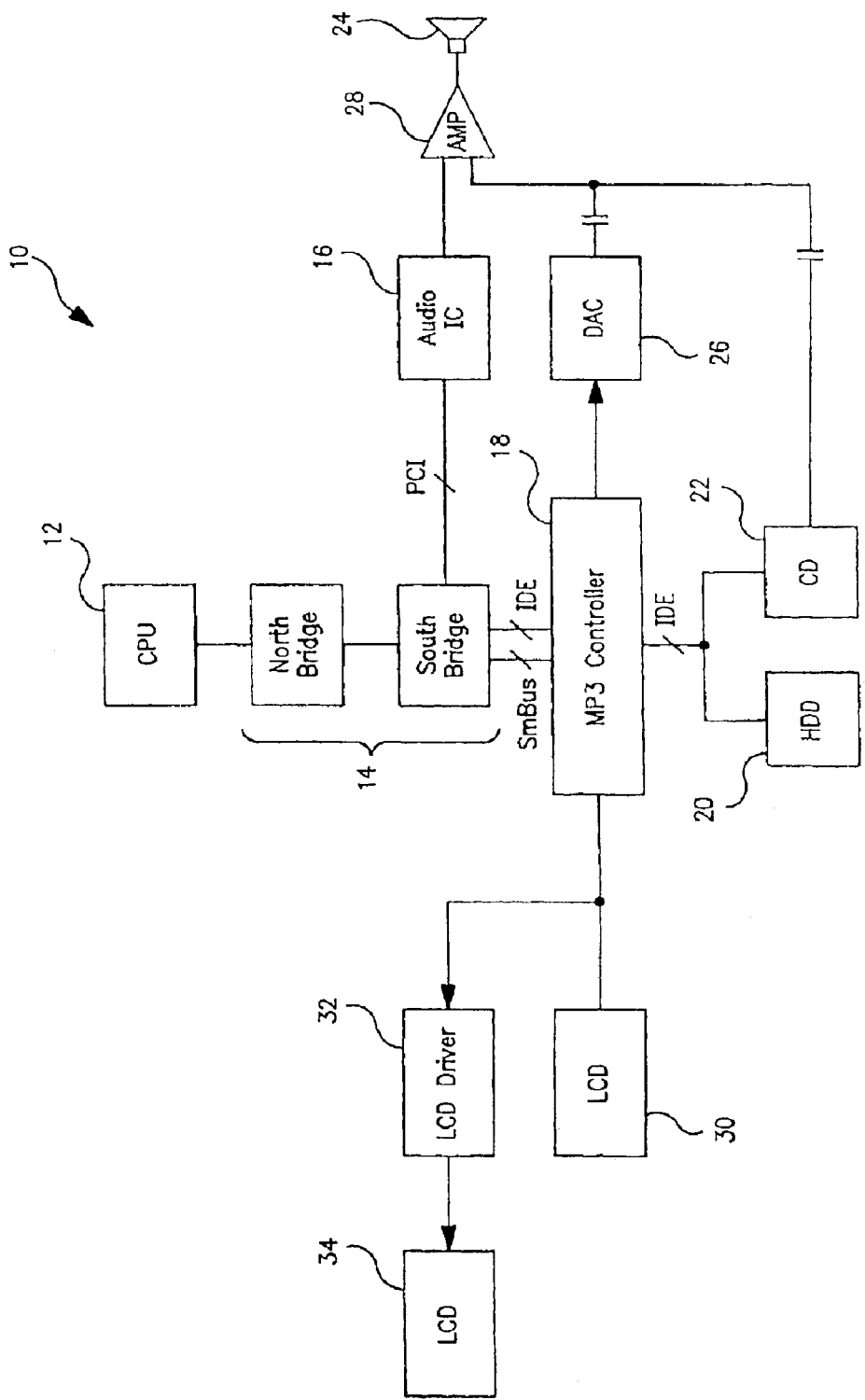
FIG. 3 is a more detailed system block diagram of the invention of FIGS. 1 and 2.

The system block diagram of FIG. 3 represent a more detailed view of the computer system 10, adapted with the MP3 controller of the present invention. As shown, the CPU 12 and Corelogic chipset 14 (depicted as conventional "North Bridge" and "South Bridge" I/O chipsets) communicate with controller 18, using both an SMBus and an IDE bus. As is understood in the art, coupling of the controller 18 to an SMBus permits the user-programmability of the controller 18. The controller 18 also communicates with the drives 20 and/or 22 along the system IDE bus. As will be described in more detail below, controller 18 can include an integrated audio DAC IC, or be adapted to feed a decompressed MP3 file to an external audio DAC 26. The external audio DAC 26 may be included as part of the integrated computer system 10 and/or a subset of the audio IC 16. In either event, the converted audio files are amplified (at amplifier 28) to provide an audible signal to speaker system 24. Additionally, as noted above, controller 18 is adapted to control drives 20, 22 to read MP3 files therefrom. To that end, to permit users to traverse directory structures on the drives, an external LCD display 30 is preferably provided. The LCD display receives directory information from drives 20 and 22 (via controller 18) and displays that information by file name/location. Likewise, the LCD display preferably displays current status information of the controller 18, as will be described in greater detail below. It should be noted that the use of LCD display 30 requires that controller 18 be adapted with appropriate LCD display driver circuitry. It may be the case, however, that the computer system 10 includes and LCD display 34 and LCD driver circuitry 32, in which case, controller 18 may be coupled directly thereto.

Figure 4:
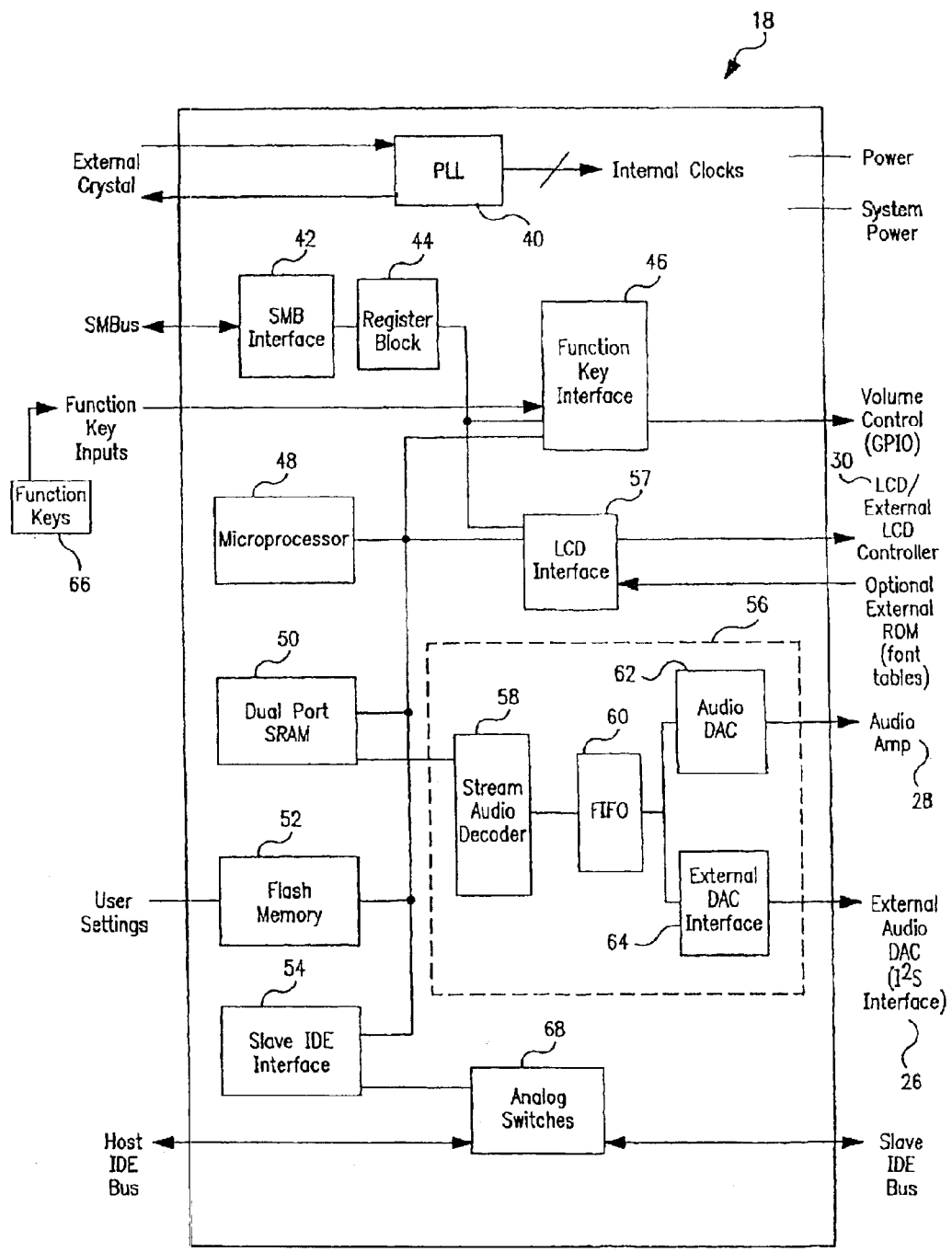
FIG. 4 is a detailed block diagram of the MP3 audio controller of the invention of FIGS. 1 and 2.

FIG. 4 depicts a detailed block diagram of the MP3 controller 18 of the present invention. As an overview, controller 18 includes an internal processor 48, memory 50 and 52, IDE bus interface 54, SMBus interface 42 and MP3 decoding circuitry 56. The overall functionality of controller 18 is the ability to traverse drives 20, 22, permit users to choose a desired MP3 file, decompress the MP3 file and output either a digital or analog signal (to be played by and external amplifier and speaker system). Each of these components depicted in FIG. 4 are described below.

Processor 48 is provided to control the general I/O functions, including access, traversal and retrieval commands for drives 20 or 22. In the preferred embodiment, external function keys 66 are provided to permit users to operate controller 18 and drives 20 or 22 to play MP3 files. Function keys can include play, pause, fast forward, rewind, next track, previous track, scan, etc. (or any combination thereof). Since, in the preferred embodiment, the controller 18 of the present invention permits traversal of directory structures and retrieval of files, it is also preferable to include MENU and ENTER function keys 66. Controller 18 includes a function key interface 46 to interpret commands generated by function keys 66 and generate commands to the processor 48. Instructions for retrieval and play of MP3 files are stored in flash memory 52. These instructions are preferably user-programmable firmware, permanently resident in memory 52. Upon activation of a function key, processor 48 receives instructions from memory 52. To communicate with drives containing MP3 data, a slave IDE interface 54 is provided. Upon user commands generated by the function keys, processor 48 instructs slave IDE interface to control one of the drives to begin traversing the directory structure. The directory structure in which MP3 files are stored by be fixed (for example, a directory may be user-specified and stored in flash memory 52), or the controller can permit users to traverse all directories and files on the drive. Once a user has selected an MP3 file and wishes to play that file (by pressing a play function key, for example), processor 48 instructs the slave IDE interface 54 to retrieve that file from the drive. Preferably, to minimize disk activity once a file selection is obtained, the file is transferred into RAM memory 50. It is most preferable to include dual port SRAM 50, as shown, to store both the audio file and to temporarily store instructions and/or program parameters used by the processor 48. Once the audio file is loaded into memory 50, the data is fed to MP3 decoder circuitry 56.

Decoder circuitry 56 comprises a stream audio decoder 58, buffer memory 60 and either an internal audio DAC 62, or a DAC interface 64 for communicating with an external audio DAC 26. Stream audio decoder 58 receives streaming audio data from memory 50 and decodes the data according to a decoder algorithm stored therein. Alternatively, a decoder algorithm may be stored in flash memory 52, loaded into memory 50 upon activation of the controller, and supplied to the decoder 58. Either way, it is preferable to permit users to update/modify the decoding algorithm. Accordingly, it is preferable that memory 52 or decoder 58 stores an updatable version of the decoder algorithm. In the preferred embodiment, decoder 58 is an MP3 audio file decoder. The output data generated by decoder 58 is decompressed digital audio data, and may include standard digital audio formats like PCM format data. The decoder outputs the decompressed data to a first in—first out (FIFO) buffer 60. If controller 18 is adapted with an internal DAC, data from the buffer 60 is fed into the DAC 60, which generates an analog audio signal, which in turn is fed to amplifier 28 and out to the speaker system (not shown). Alternately, if an external DAC is available in the computer system 10 (for example, as part of the audio IC), the decoder can include an appropriate interface 64. Interface 64 receives digital data from memory 60 and communicates with an external DAC. In a similar fashion, the external DAC 26 generates an analog signal which is supplied to the amplifier 28 and speaker system.

As discussed briefly above, the controller preferably includes an SMBus interface 42 to permit controller 18 to communicate with an SMBus of computer system 10. The SMBus is provided for when the system is ON to pass along function key commands to the system 14 and 12, and is also used to access the flash memory 52 of the controller 18 to permit upgrades and/or changes therein. Once commands are sent to the interface 46, the commands are communicated to the processor 48 for processing. It is also preferable that controller 18 include an LCD interface 57, which is coupled to the SMBus (via register block 44) and processor 48. In this way, the LCD interface 57 can generate signals indicative of both the users actions via function key interface 46, and the processor status. Processor status may include overall operation status (e.g., file loading, decompressing, file not found, etc.) and specific operational parameters (e.g., error status, component failure, etc.). Additionally, it is preferable to display the drive data, which may include directory tree structure, file name(s), etc. Additionally, MP3 files typically contain an ID tag that is descriptive of the title, song, etc. It is preferable that LCD interface 57 be adapted to read and display this tag data. Thus, LCD interface 57 is preferably adapted to display such drive data generate by processor 48.

Controller 18 includes an internal clocking mechanism 40 to clock the circuitry of the controller, and to communicate with timed devices (drives 20 or 22) over a timed bus (e.g., IDE bus). It will be understood by those skilled in the art that more than one clock frequency is typically required, for example, differing clocks supplied to processor 48, decoder 58 and audio DAC 62. The clock mechanism preferably includes a PLL timer that is clocked by a set crystal, as shown.

As described above, the controller 18 of the preferred embodiment operates to play compressed audio files when the system 10 is OFF. To that end, it is preferred that the controller 10 is activated by a user pressing one of the function keys (i.e., system power is supplied to controller 18 by pressing one of the function keys 66). Upon this event, power is coupled to the components of controller 18, and to the drive systems 20 and/or 22. By the same token, if the system 10 is ON, the controller of the present invention includes switches 68. Switches 68 operate to decouple the controller 18 from the IDE bus (as shown in FIG. 3), thereby becoming transparent to the drives 20, 22 and the audio subsystem 16.

It should be noted that the controller 18 is preferably operable with both hard disk drives 20 and CD-ROM drives 22, either of which are conventional storage media for MP3 audio files. Accordingly, function keys 66 also preferably include activation keys for the CD-ROM drive, which may include EJECT, FF/SCAN-FF, RW/SCAN-RW, PLAY, PAUSE, STOP, MENU, ENTER etc.

Figure 5A:
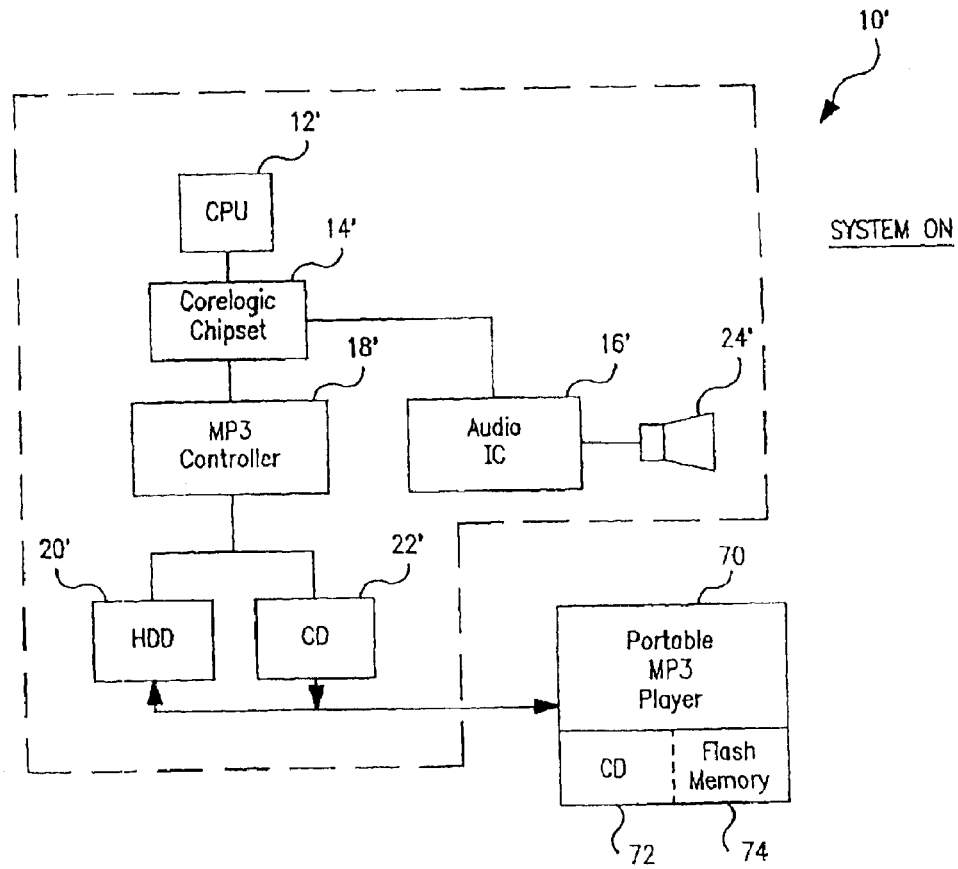
FIG. 5A is an exemplary block diagram of another embodiment of the present invention, depicting a portable system in an ON state, adapted to receive and play MP3 digital audio files, and utilizing an external MP3 decoding device.
Figure 5B:
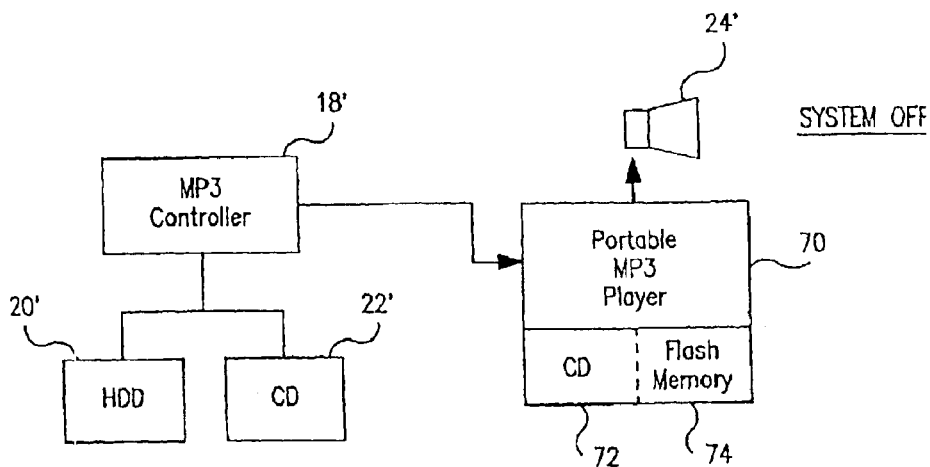
FIG. 5B is an exemplary block diagram of another embodiment of the present invention, depicting a portable system in an OFF or inactive state adapted to receive and play MP3 digital audio files, and utilizing an external MP3 decoding device.

FIGS. 5A and 5B depict another embodiment of the computer system 10' of the present invention. Similar to the embodiment of FIGS. 1 and 2, the present embodiment includes an MP3 controller 18' incorporated into a computer system 10'. In this embodiment, however, the controller 18' is operable with an external MP3 player 70. FIG. 5A depicts the system 10' when power is supplied to the system components: CPU 12', Corelogic chipset 14', Audio IC 16' and drives 20' and/or 22'. When the system is on, MP3 audio files stored on either drive 20' or 22' can be transferred to the external device 70. External MP3 players may include a CD player 72 for reading CDs having MP3 files stored thereon, and/or internal memory 74 for temporary storage of MP3 files. Similar to the previous embodiment, controller 18' preferable is transparent to system 10' when power is ON. In FIG. 5B, the system components are OFF or inactive. Controller 18' operates to decompress MP3 files and send the decompressed data to external player 74. Alternatively, controller 18' can operate to transmit the compressed data to the external player 74, where the data is decompressed into an appropriate audio format by the player 74. It is preferable that the external device 70 include conventional I/O interface (not shown) for connection to controller 18' (via system 10'). For example, controller 18' and player 70 may include conventional RS232 (serial), USB, and/or TCP/IP communications to exchange commands and transfer data therebetween. The decompressed files can be stored in memory 74 of the external player 70.

Controller 18' includes similar components as the controller 18 of the previous embodiment, except that it may not be necessary to include function keys 66 and function key interface 46, since it is likely that portable player 70 includes such functionality. Similarly, it may not be necessary to include display functionality with controller 18' if portable player 70 is equipped with an appropriate display to view drive directory structures and files.

Thus, it is evident that there has been disclosed an audio controller for portable electronic devices that satisfies the aims and objectives stated herein. Those skilled in the art will recognize numerous modifications that may be made to the present invention. For example, although the controller 18 and 18' of the present invention has been described with reference to MP3 audio data, it should be readily apparent that the controller 18 and 18' is independent of the specific format of audio data, and should instead be viewed as a general-purpose audio controller capable of receiving, playing, and/or decompressing any type of audio data, not limited to MP3 format data.

Other modifications are possible. For example, the controller 18 of FIGS. 3 and 4 is depicted and described as being coupled (or decoupled) to an IDE bus, those skilled in the art will recognize that the controller can likewise include other bus interface technologies, depending on the bus configuration of system 10. Thus, for example, controller 18 may be modified to control SCSI drives, and include an SCSI interface for exchanging commands and data according to SCSI protocols. Likewise, it may be desirable to adapt controller 18 with conventional network protocols (e.g., TCP/IP, etc.) for communication with remote systems (not shown) in a conventional network.

Still further modifications are possible. The controller 18 of the present invention has been described herein as including decoding circuitry 56 to decode audio data when the system 10 is OFF. However, it is contemplated that audio files, such as MP3 files could be decoded and stored in a decoded format on the drives 20 and/or 22, for example when the system 10 is ON. If decoded (decompressed) is accessed by the controller 18, this data is stored into memory 50 and supplied directly to audio DAC 62 or audio DAC interface 64. In other words, no decoding is necessary for such data and controller 18 plays the decoded data directly.

Figure 6:
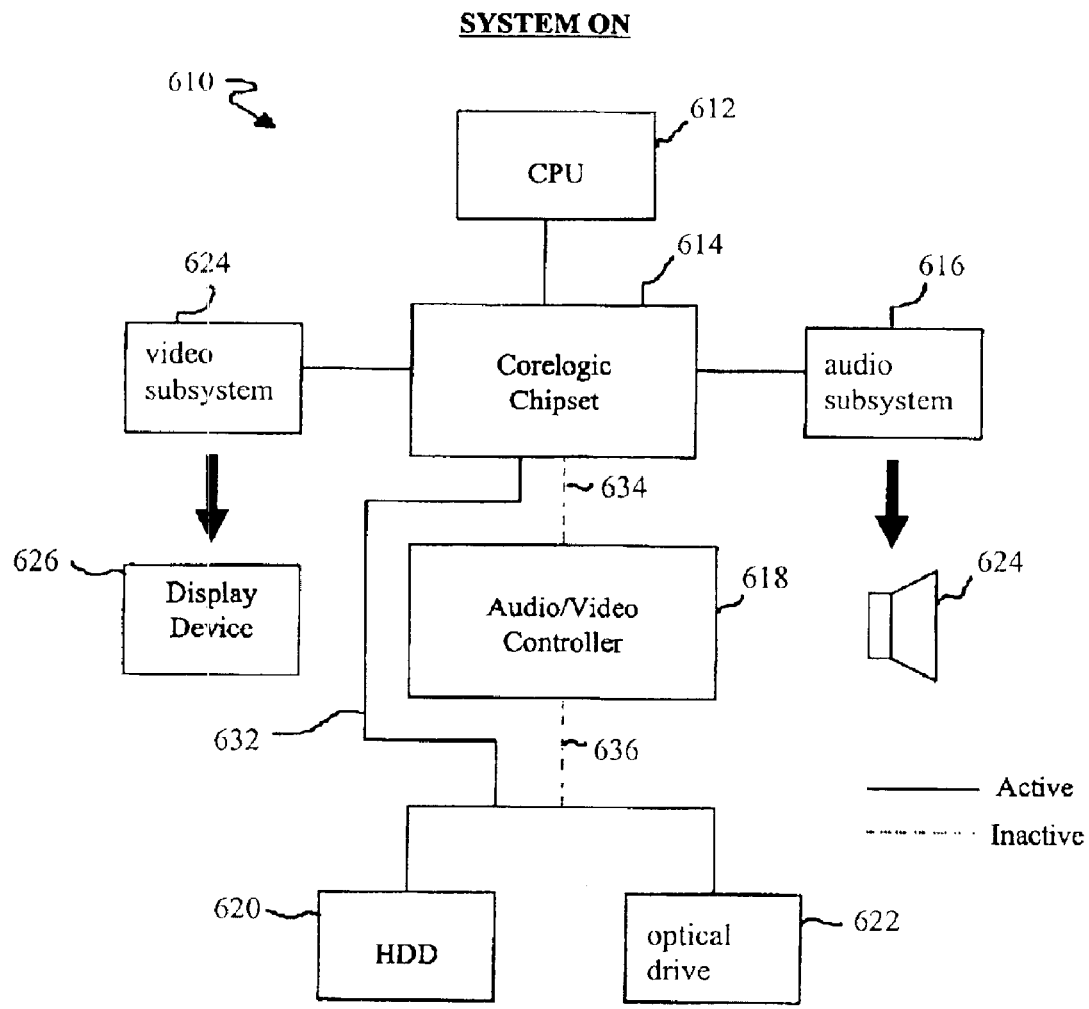
FIG. 6 is a block diagram of an exemplary computer system in an ON state where an audio/video controller consistent with the invention is transparent to the computer system.
Figure 7:
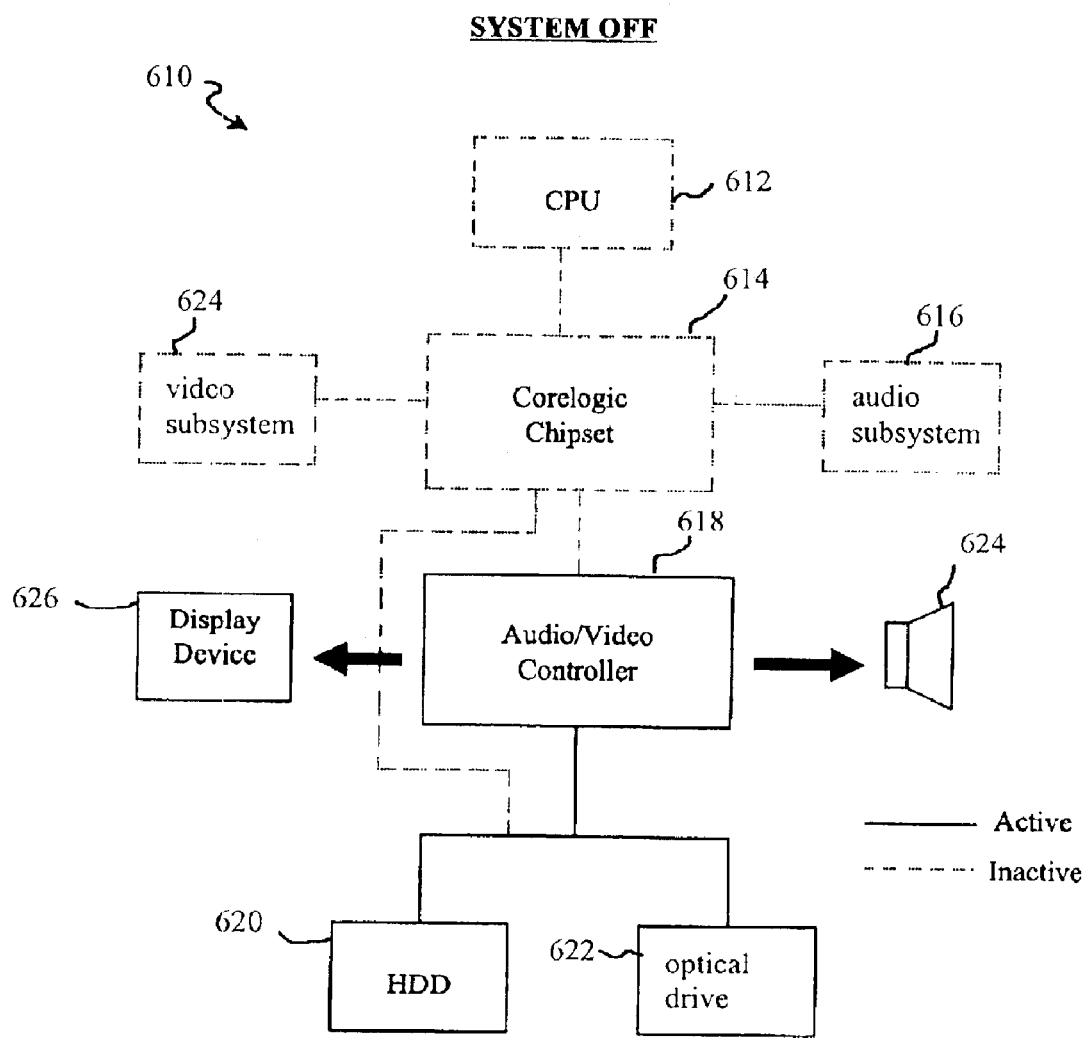
FIG. 7 is a block diagram of the exemplary computer system of FIG. 6 where the computer system is in an inactive state and the audio/video controller consistent with the invention enables a user to access data in the drives.

Turning to FIGS. 6 and 7, another embodiment of a computer system 610 having an audio/video controller 618 consistent with invention is illustrated. In general, the audio/video controller 618 is adapted to permit access to audio data, video data, or combined audio/video data while the computer system is in an inactive state. Again, an inactive state is a state in which main power is not being supplied to the computer system 610, i.e., an OFF state, or when the system is in a sleep mode (such as may be defined under power management specifications.)

FIG. 6 illustrates a computer system 610 having an audio/video controller 618 consistent with the invention when the computer system 610 is in an ON state. Generally, the computer system 610 includes a system CPU 612, a Corelogic chipset 614, an audio subsystem 616 coupled to an audio output device such as speaker system 624, a video subsystem 624 coupled to a video output device such as display device 626, a hard disk drive 620 and an optical drive 622, e.g., a DVD-ROM or CD-ROM drive. When the main power is delivered to the computer system 610, i.e., the computer is ON, the audio/video controller 618 does not control the play of audio, video, or audio/video files, since such functionality is handled by the CPU 612 and the appropriate decoder as represented by active path 632 from the Corelogic chipset 614 to the drives 620, 622 and the inactive paths 634, 636 from the audio/video controller 618 to the Corelogic chipset 614 and drives 620, 622 respectively. Therefore, when the computer system is ON, the audio/video controller 618 is essentially transparent to commands between the drives 620, 622 and the CPU 612. Although the drives 620, 622 are depicted as a hard disk drive and an optical drive, those skilled in the art will recognize that any drive or storage medium may be substituted for such drives without departing from the scope of the present invention.

Turning to FIG. 7, the computer system 610 of FIG. 6 is illustrated when the computer system 610 is in an inactive state. In this instance, the audio/video controller 618 consistent with the invention operates to permit users to have access to data, e.g., audio data, video data, or combined audio/video data, on the drives 620, 622 without requiring that the CPU 612, the Corelogic chipset 614, the audio subsystem 616, or the video subsystem 624 to be operating.

Figure 8:
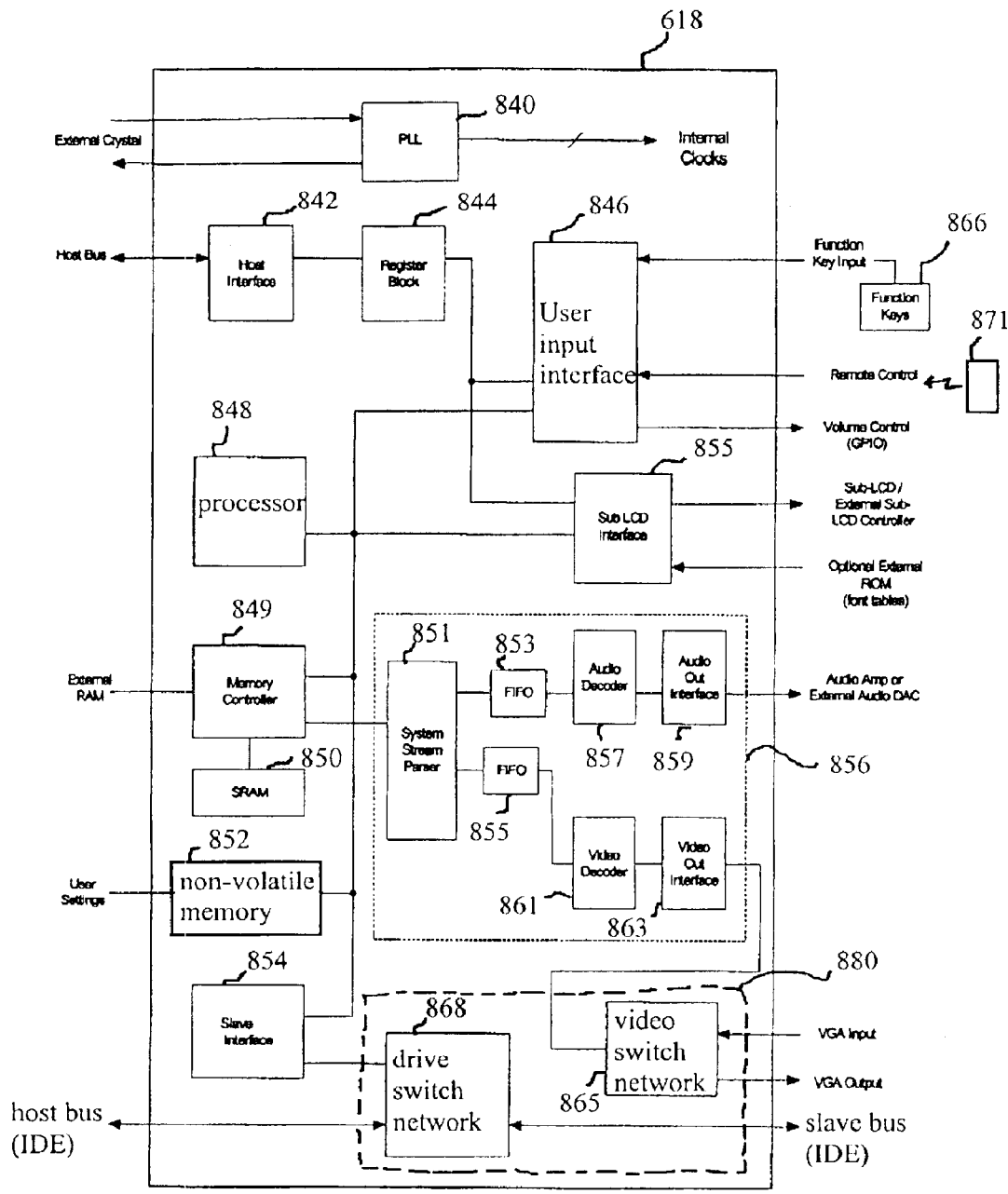
FIG. 8 is a more detailed block diagram of the audio/video controller of FIGS. 6 and 7.

Turning to FIG. 8, a more detailed block diagram of the audio/video controller 618 of FIGS. 6 and 7 is illustrated. In general, the controller 618 includes some similar components as the earlier detailed audio controller 18 of FIG. 4 and has additional components as further detailed herein related to video functionality. The controller 618 includes a processor 848 to execute user commands or host commands such as access, traversal, and retrieval of data from various drives 620, 622 when the computer system is in an inactive state. In one embodiment, the processor 848 may be a microprocessor.

User commands may be entered via function keys 866 or via a remote control system. The remote control system includes a remote controller 871 and associated circuitry (not illustrated) to enable a user to provide signals to the controller 618. Such remote controller 871 may have at least all the keys and functionality of the aforementioned function keys 866. The remote controller could utilize any known type of control technologies such as Infrared or radio frequency (RF). A transceiver circuit may accept such remote control signals and provide associated signals to the user input interface 846. As such, a user of the computer system 610 can access available data in the drives via the remote controller 871 or via the function keys 866.

In any event, once a user inputs a desired command via the function keys 866 or the remote controller 871, a user input interface circuit 846 interprets such commands and generates associated commands to the processor 848. Detailed commands for retrieval and play of various data files may be stored in non-volatile memory 852.

Upon user commands, the processor 848 instructs the slave interface 854 to control one of the drives. Once a user has selected data, e.g., an audio file and/or a video file, by activation of the proper key on the function keys 866 or remote controller 871, the processor 848 instructs the slave interface 854 to retrieve that data from a drive. The data may then be stored in memory. Such memory may include an internal memory 850 of the controller 618, e.g., SRAM. Such memory may also include any variety of external memory external to the controller 618 for use by the controller 618, e.g., external RAM. A memory controller 849 may also be coupled to both the internal memory 850 and the external memory. As such, the processor 848 can control storage of selected data utilizing either the internal memory or external memory or both. In general, the processor 848 will utilize the internal memory 850 for faster data access and when additional data buffers are needed it may then utilize the external memory as well. For instance, the external memory may be utilized when complex decoding by the decoder circuit 856 needs a significant amount of memory which is most cost effectively provided by the external memory.

The controller 618 may further include a decoder circuit 856 configured to decode data selected by a user. The decoder circuit 856 may generally include a parser circuit 851 configured to parse required data into either audio data or video data. Audio data from the parser circuit 851 is then provided to an audio decoder 857. An optional audio buffer 853, e.g., a FIFO buffer, may be coupled between the parser circuit 851 and the audio decoder 857 to temporarily store such audio data.

The audio decoder 857 decodes the audio data according to an audio data decoder algorithm. The audio data decoder algorithm may be implemented in any variety of ways known in the art. For instance, the audio data decoder algorithm may be implemented using hardware, e.g., hard-wire logic, or software, e.g., where the algorithm may be stored in non-volatile memory 852 or internal memory inside the audio decoder 857 and may be updated or modified by users. The output of the audio decoder 857 is decompressed audio data. The audio out interface 859 may contain an internal DAC to generate an analog audio signal which in turn is fed to an amplifier and speaker. Alternatively, an external DAC may be utilized and the audio out interface 859 would provide digital audio data to the external DAC.

The video decoder 861 decodes the video data from the parser circuit 851 according to a video data decoder algorithm. An optional video buffer 855, e.g., a FIFO buffer, may be coupled between the parser circuit 851 and the video decoder 861 to temporarily store such video data. The video data decoder algorithm may also be implemented in a variety of ways known in the art. For instance, the video data decoder algorithm may be implemented using hardware, e.g., hardwire logic, or software, e.g., where the algorithm may be stored in non-volatile memory 852 or internal memory inside the video decoder 861 and may be updated or modified by users. The output of the video decoder 861 is decompressed video data. A video output interface circuit 863 accepts such decompressed video data and provides such data to an appropriated video output device depending on the state of the video switch network 865 as further detailed herein.

The controller 618 also includes a switch network 880. The controller's processor 848 utilizes this switch network 880 to perform data access from the drives 620, 622 or to provide outputs to the external video display device 626 when the computer system is in an inactive state.

For instance, the switch network 880 may include a drive switch network 868 and a video switch network 865. The drive switch network 868 may have a first switch state when the computer system is in an active state and a second switch state when the computer system is in an inactive state. In the first switch state, the drive switch network 868 decouples the controller 618 from the drive of the computer system such that the controller 618 becomes transparent to the drive bus, e.g., the IDE bus. In contrast, in the second switch state the drive switch network 868 couples the controller to a drive of the computer system via the drive bus.

Similarly, the video switch network 865 may also have a first switch state when the computer system is in an active state and a second switch state when the computer system is in an inactive state. In the first switch state, the video switch network 865 decouples the controller 618 from the video output device 626. In essence, the video switch network 865 couples an input video signal, e.g., from a VGA chip, directly to an output port to a video output device such that the controller 618 is effectively bypassed. In contrast, in the second switch state the video switch network 865 couples the controller to a video output device of the computer system.

The controller 618 may also include an internal clocking mechanism 840 to clock the circuitry of the controller and to communicate with time devices such as the drives over a timed bus such as an IDE bus. The clock mechanism may include a PLL timer that is clocked by a set crystal as shown.

The controller 618 may also include a host interface 842 to permit communication between the computer system 610 and the controller 618. Communication may occur via a serial bus such as SMBus or USB to reduce the number of pins and cost of the controller 618. A register block 844 may also be provided such that the host computer can utilize the register block to control various functions of the controller 618, e.g., to enable access to the non-volatile memory 852 to permit upgrades and/or changes therein. The controller 618 may also include an LCD interface 855 which is coupled to the host bus (via register block 844) and processor 848. In this way, the LCD interface 855 can generate signals indicative of various activities such as user actions and processor status.

There is thus provided a computer system including a computer subsystem and a controller, the computer system adapted to play data when the computer system is in an inactive state. The computer subsystem includes a system CPU and a drive for storing data. The controller is configured to access the drive to retrieve data and decode the data when the computer system is in an inactive state.

It will be appreciated that the functionality described for the embodiments of the controller consistent with the invention may also be implemented using software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

Those skilled in the art will recognize numerous additional modifications, and all such modifications are deemed within the spirit and scope of the present invention, only as limited by the appended claims.

What is claimed is:

1. A computer system adapted to access data when said computer system is in an inactive state, said computer system comprising:
   a computer subsystem comprising a system CPU and a drive for storing data; and
   a controller comprising:
      a drive interface configured to selectively access said data from said drive;
      a decoder circuit configured to decode said data and provide decoded data; and
         a processor configured to control a switch network, which comprises a video switch network having a first switch state and a second switch state, said first switch state decoupling said decoder circuit from a video output device of said computer subsystem, wherein said controller is configured to access said drive to retrieve said data and decode said data when said computer subsystem is in said inactive state.

2. The computer system of claim 1, wherein said data comprises audio data.

3. The computer system of claim 1, wherein said data comprises video data.

4. The computer system of claim 1, wherein said decoder circuit comprises a parser circuit configured to parse said data into audio data and video data.

5. The computer system of claim 4, wherein said decoder circuit further comprises an audio decoder configured to receive said audio data and provide a decompressed stream of audio data.

6. The computer system of claim 5, wherein said decoder circuit further comprises an audio buffer coupled to said parser circuit and said audio decoder, said audio buffer configured to provide temporary storage of said audio data.

7. The computer system of claim 4, wherein said decoder circuit further comprises a video decoder configured to receive said video data and provide a decompressed stream of video data.

8. The computer system of claim 7, wherein said decoder circuit further comprises an video buffer coupled to said parser circuit and said video decoder, said video buffer configured to provide temporary storage of said video data.

9. The computer system of claim 1, further comprising memory for storing said data.

10. The computer system of claim 9, wherein said controller further comprises a memory controller and wherein said processor controls storage of said data in said memory utilizing said memory controller.

11. The computer system of claim 9, wherein said memory comprises an internal memory and an external memory.

12. The computer of claim 1, wherein said video switch network in said second switch state couples said decoder circuit to said video output device, said second switch state occurring when said computer system is in said inactive state.

13. The computer of claim 1, wherein said switch network comprises a drive switch network having another first switch state and another second switch state, said another first switch state decoupling said drive of said computer subsystem from said controller.

14. The computer of claim 13, wherein said drive switch network in said another second switch state couples said drive to said controller, said second switch state occurring when said computer subsystem is in said inactive state.

15. The computer system of claim 1, wherein said processor is configured to control an operation of said drive and said decoder circuit.

16. The computer system of claim 15, wherein said controller further comprises a non-volatile memory configured to store data and commands for use by said processor for controlling said drive and said decoder circuit.

17. The computer system of claim 1, wherein said drive is an optical drive.

18. The computer system of claim 1, wherein said drive is a hard disk drive.

19. The computer system of claim 1, wherein said controller further comprises a user interface configured to accept at least one signal from a plurality of function keys, said function keys generating user commands to said controller through said user interface.

20. The computer system of claim 1, wherein said controller further comprises a user interface configured to accept at least one signal from a remote controller, said remote controller generating user commands to said controller through said user interface.

21. The computer system of claim 1, wherein said controller further comprises an LCD interface configured to provide signals to an associated LCD display.

* * * * *